United States Patent
Nagata et al.

(10) Patent No.: US 9,800,861 B2
(45) Date of Patent: Oct. 24, 2017

(54) IMAGE CAPTURE APPARATUS AND IMAGE SIGNAL PROCESSING APPARATUS

(75) Inventors: Keiji Nagata, Yokohama (JP); Makiko Saito, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 533 days.

(21) Appl. No.: 13/361,491

(22) Filed: Jan. 30, 2012

(65) Prior Publication Data

US 2012/0212581 A1  Aug. 23, 2012

(30) Foreign Application Priority Data

Feb. 17, 2011 (JP) ................................. 2011-032629

(51) Int. Cl.
H04N 13/02 (2006.01)

(52) U.S. Cl.
CPC ..... H04N 13/0296 (2013.01); H04N 13/0217 (2013.01); H04N 13/0232 (2013.01)

(58) Field of Classification Search
CPC ........... H04N 13/0217; H04N 13/0296; H04N 13/0232
USPC .......................................................... 348/46
See application file for complete search history.

(56) References Cited

U.S. PATENT DOCUMENTS

| | | | |
|---|---|---|---|
| 4,410,804 A | 10/1983 | Stauffer | |
| 7,557,843 B2* | 7/2009 | Shizukuishi | 348/294 |
| 7,781,716 B2* | 8/2010 | Anderson et al. | 250/208.1 |
| 2005/0128328 A1 | 6/2005 | Kakumoto et al. | |
| 2008/0011948 A1* | 1/2008 | Davilla | G01T 1/36 250/307 |
| 2008/0297633 A1* | 12/2008 | Wada | H04N 5/235 348/272 |
| 2009/0086063 A1* | 4/2009 | Suzuki et al. | 348/241 |
| 2009/0201405 A1 | 8/2009 | Mori et al. | |
| 2010/0039545 A1* | 2/2010 | Ishiwata | 348/308 |
| 2010/0086293 A1* | 4/2010 | Iwane | 396/91 |
| 2010/0176271 A1* | 7/2010 | Rim et al. | 250/208.1 |
| 2010/0282945 A1* | 11/2010 | Yokogawa | 250/208.1 |
| 2011/0109776 A1* | 5/2011 | Kawai | 348/273 |

FOREIGN PATENT DOCUMENTS

| | | |
|---|---|---|
| CN | 1893540 A | 1/2007 |
| CN | 101461230 A | 6/2009 |
| CN | 101609837 A | 12/2009 |

(Continued)

OTHER PUBLICATIONS

Hayasaka et al. "JP 2010-263501 Translation". Nov. 2010.*

(Continued)

*Primary Examiner* — Zhihan Zhou
(74) *Attorney, Agent, or Firm* — Cowen, Liebowitz & Latman, P.C.

(57) ABSTRACT

An image capture apparatus includes an image capture unit that has a plurality of unit pixels each including a plurality of photo-electric conversion units per condenser unit, and a recording unit that records captured image signals, which are captured by the image capture unit and are respectively read out from the plurality of photo-electric conversion units, and the recording unit records identification information which allows to identify each photo-electric conversion unit used to obtain the captured image signal in association with that captured image signal.

18 Claims, 8 Drawing Sheets

(56) References Cited

FOREIGN PATENT DOCUMENTS

| DE | 102009049387 A1 | 4/2011 |
|---|---|---|
| EP | 0840502 A2 | 5/1998 |
| EP | 2037672 A1 | 3/2009 |
| JP | 58-024105 | 2/1983 |
| JP | 2003-523646 A | 8/2003 |
| JP | 2007-325139 | 12/2007 |
| JP | 2008-141517 A | 6/2008 |
| JP | 2010-263501 A | 11/2010 |
| JP | 2010-283512 A | 12/2010 |
| WO | 00/50927 A2 | 8/2000 |

OTHER PUBLICATIONS

British Search/Examination Report dated Jun. 18, 2012 that issued in the corresponding British Patent Application No. GB1202670.4.
Feb. 24, 2014 Chinese Office Action, with an English Translation, that issued in Chinese Patent Application No. 201210038740.5.
Feb. 18, 2014 Korean Office Action, without English Translation, that issued in Korean Patent Application No. 10-2012-0015811.
Please disregard the earlier Information Disclosure Statement (SB/08a) with the incomplete CN documents filed on Apr. 4, 2014. Applicant respectfully requests that the Examiner kindly replace the SB/08a form filed on Apr. 4, 2014 with the attached replacement SB/08a form, kindly consider and enter the complete CN references cited which now includes and English Abstract.
Nov. 17, 2014 Japanese Office Action, without an English Translation, that issued in Japanese Patent Application No. 2011-032629.
Jun. 16, 2015 Chinese Office Action, with an English Translation, that issued in Chinese Patent Application No. 201210038740.5.
Fife,Keith; El Gamal, Abbas; Wong, H.-S.Philip: A Multi-Aperture Image Sensor with 0.7 μm Pixels in 0.11 μm CMOS Technology. IEEE, Journal of Solid-State Circuits,JSSC,vol. 43,No. 12,Dec. 2008,pp. 2990-3005.
Tanida,Jun;Kumagai,Tomoya;Yamada,Kenji;Miyatake,Shigehiro et al:Thin Observation Module by Bound Optics (Tombo):Concept and Experimental Verification.Applied Optics,vol. 40,No. 11,Apr. 2001,S.1806-1813.
Mar. 23, 2016 German Office Action, that issued in German Patent Application No. 102012202386.0.

\* cited by examiner

IMAGE CAPTURE APPARATUS AND IMAGE SIGNAL PROCESSING APPARATUS

BACKGROUND OF THE INVENTION

Field of the Invention

The present invention relates to a technique for acquiring captured image signals for stereoscopic vision, and generating image signals.

Description of the Related Art

In recent years, stereoscopic images and stereoscopic image-related devices such as 3D movies and 3D displays have rapidly prevailed. Capturing of stereoscopic images is conventionally done using a film camera or the like. However, along with the popularization of digital image capture apparatuses such as digital cameras and digital video cameras, images as generation sources of stereoscopic images are captured using these digital image capture apparatuses.

The following mechanism for appreciating stereoscopic images is generally used. That is, "right-eye image" and "left-eye image" having a parallax in a right-and-left direction are prepared in correspondence with an image when the user views an object by the right eye and that when he or she views it by the left eye, and the user views the "right-eye image" by the right eye and the "left-eye image" by the left eye. As this method, a method of dividing an image to be appreciated to have a parallax using a parallax barrier system, lenticular system, or the like, and a method of controlling different images to become incident on the right and left eyes via right and left filters having different characteristics are known.

As an image capture method of images which can be appreciated as stereoscopic images, a method of simultaneously capturing images at different view points is available.

In a solid state image sensor described in Japanese Patent Laid-Open No. 58-24105, a plurality of microlenses are formed on the solid state image sensor, and at least a pair of photodiodes are disposed in the vicinity of each of these plurality of microlenses. A first image signal is obtained from an output of one photodiode of this photodiode pair, and a second image signal is obtained from the other photodiode. As described in Japanese Patent Laid-Open No. 58-24105, when the first and second image signals obtained in this way are used as the "right-eye image" and "left-eye image" described above, stereoscopic images can be appreciated.

A solid state image sensor described in Japanese Patent Laid-Open No. 2007-325139 has an arrangement in which a plurality of microlenses are also formed on the solid state image sensor, and a plurality of photodiodes are disposed for each microlens. As a characteristic arrangement of Japanese Patent Laid-Open No. 2007-325139, the plurality of photodiodes which are disposed in correspondence with one microlens are connected to each other via gates. Therefore, whether signals of the neighboring photodiodes are to be added in a pixel or they are read out without being added can be controlled.

Japanese Patent Laid-Open No. 2007-325139 obtains captured image signals and focus detection signals of an image capture apparatus using the solid state image sensor with the aforementioned arrangement. In a normal image capture mode, signals of all photodiodes are added to generate captured image signals. In a focus detection mode, signals having a parallax have to be obtained. In order to obtain signals having a parallax in the right-and-left direction, photodiodes, which neighbor in an up-and-down direction, need only be connected. Also, in order to obtain signals having a parallax in the up-and-down direction, photodiodes, which neighbor in the right-and-left direction, need only be connected. Japanese Patent Laid-Open No. 2007-325139 presents the following use method. That is, using the solid state image sensor with this arrangement, accurate focus detection is attained using combinations of addition results of the photodiodes, which are suited to focus detection of an object image, in accordance with the pattern of the object image.

Image signals generated by an image capture apparatus are normally printed on media such as paper or are displayed on a display device such as a television, monitor, or projector when they are appreciated. The same applies to 2D images and 3D images.

In order to appreciate stereoscopic images, as described above, the user has to view images having a parallax in the right-and-left direction by the corresponding eyes. Therefore, in all the systems described in the related art, the "right-eye image" to be appreciated by the right eye and the "left-eye image" to be appreciated by the left eye have to be prepared.

The related art literatures explain the solid state image sensor having the arrangement in which the plurality of microlenses are formed on the solid state image sensor, and a plurality of photodiodes are disposed for each microlens. Also, as described in these literatures, a plurality of captured image signals, which can be respectively used as the "right-eye image" and "left-eye image" displayable as stereoscopic images, can be obtained using the solid state image sensor with such arrangement.

However, with the inventions described in the related art literatures, although the "right-eye image" and "left-eye image" can be obtained, a parallax between the "right-eye image" and "left-eye image" often has a direction that does not allow these images to be appreciated as stereoscopic images.

That is, in the technique described in Japanese Patent Laid-Open No. 58-24105, the layout of photodiode pairs at the time of design decides, in advance, the direction of a parallax of captured images.

Or in the technique described in Japanese Patent Laid-Open No. 2007-325139, the direction of a parallax of captured images is decided by combinations of addition results of photodiodes, which are selected according to an object image, when signals are read out from the photodiodes. That is, the "right-eye image" and "left-eye image", which are generated from signals read out from an image capture apparatus, can have only a parallax in one direction, which is decided in advance before signals are read out.

Therefore, when the parallax direction of images does not match that of the two eyes of the user upon appreciating captured images, the user cannot recognize these images as stereoscopic images. For example, when images having a parallax in the right-and-left direction are displayed while being rotated through 90° from a normal position, the parallax direction of the two images changes from the right-and-left direction to the up-and-down direction, and these images cannot be appreciated as stereoscopic images, thus posing a problem.

SUMMARY OF THE INVENTION

The present invention has been made in consideration of the aforementioned problems, and allows to generate and display, based on captured image signals captured using an image capture apparatus, images having a parallax in a direction suited to be appreciated as stereoscopic images independently of their display directions.

The first aspect of the present invention provides an image capture apparatus comprising: image capture unit having a plurality of unit pixels each comprising a plurality of photo-electric conversion units per condenser unit; and recording unit configured to record captured image signals, which are captured by the image capture unit and are respectively read out from the plurality of photo-electric conversion unit, wherein the recording unit records identification information which allows to identify each photo-electric conversion unit used to obtain the captured image signal in association with that captured image signal.

The second aspect of the present invention provides an image signal processing apparatus generating image signals for stereoscopic vision using captured image signals in respective photo-electric conversion unit of the above image capture apparatus, and pieces of identification information respectively associated with the captured image signals.

Further features of the present invention will become apparent from the following description of exemplary embodiments with reference to the attached drawings.

DESCRIPTION OF THE EMBODIMENTS

Figure 1:
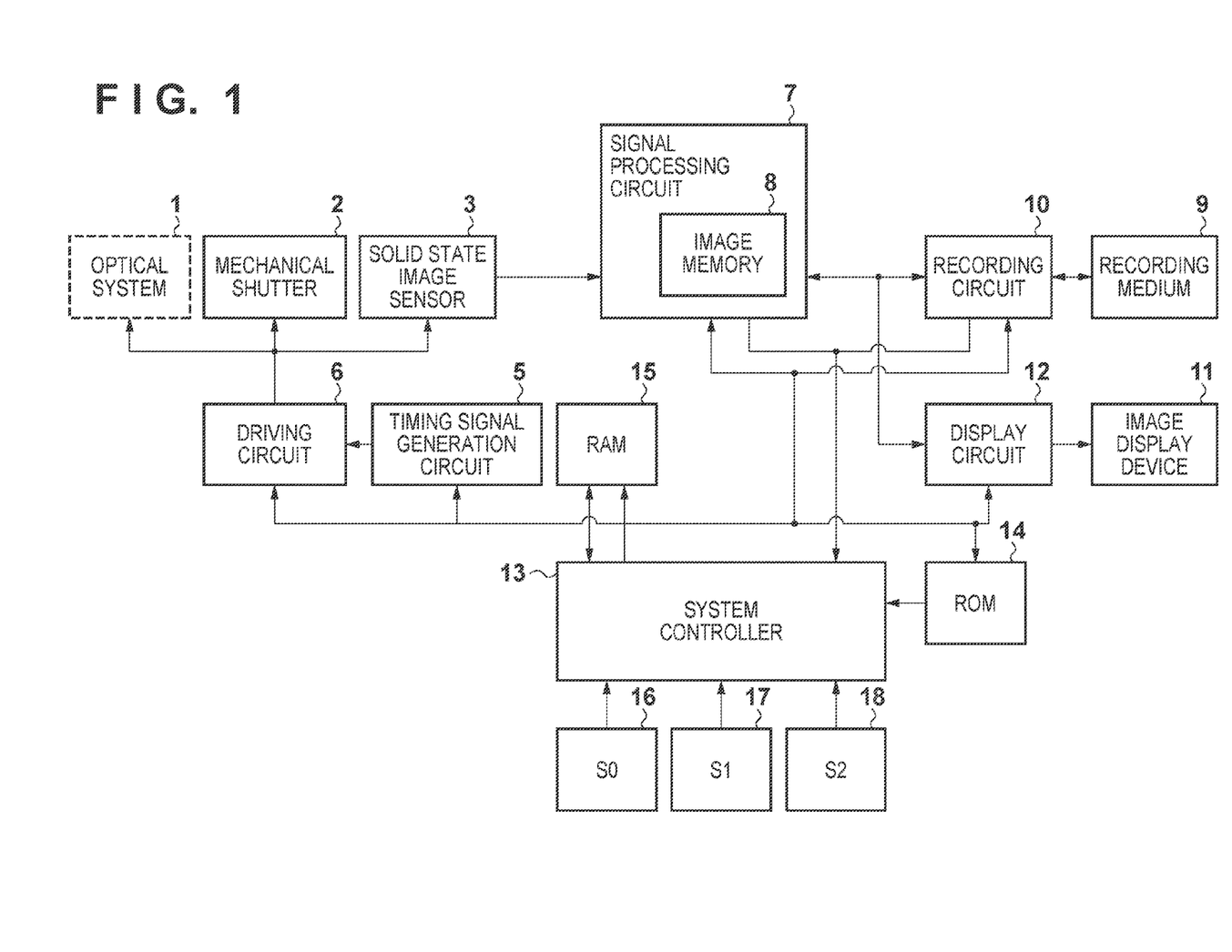
FIG. 1 is a block diagram showing the overall arrangement of an image capture apparatus according to one embodiment of the present invention.

One embodiment of the present invention will be described in detail hereinafter with reference to the accompanying drawings. FIG. 1 is a block diagram showing the overall arrangement of an image capture apparatus according to one embodiment of the present invention. Referring to FIG. 1, reference numeral 1 denotes an optical system including optical members such as a lens and stop. Reference numeral 2 denotes a mechanical shutter which intercepts light on a solid state image sensor (to be described below) so as to control an exposure time of the solid state image sensor. Reference numeral 3 denotes a solid state image sensor which converts irradiated light into an electrical signal, and outputs it as a captured image signal. Details of the solid state image sensor of this embodiment will be described later.

Reference numeral 5 denotes a timing signal generation circuit, which generates required signals for a driving circuit 6, so as to operate the solid state image sensor 3. Reference numeral 6 denotes a driving circuit for the optical system 1, mechanical shutter 2 and solid state image sensor 3. Reference numeral 7 denotes a signal processing circuit, which executes signal processing such as various kinds of correction required for captured image signals, and generates image signals from the captured image signals which have undergone the signal processing. Reference numeral 8 denotes an image memory, which stores the captured image signals that have undergone the signal processing, and the image signals. Reference numeral 9 denotes a recording medium detachable from the image capture apparatus.

Reference numeral 10 denotes a recording circuit, which records the captured image signals that have undergone the signal processing on the recording medium 9. Reference numeral 11 denotes an image display device, which displays the image signal that has undergone the signal processing. Reference numeral 12 denotes a display circuit, which displays the image signals on the image display device 11. Reference numeral 13 denotes a system controller which controls the overall image capture apparatus.

Reference numeral 14 denotes a nonvolatile memory (ROM). The nonvolatile memory 14 stores a program that describes a control method to be executed by the system controller 13, control data including parameters and tables to be used upon execution of the program, and data used for various kinds of correction of image signals.

Reference numeral 15 denotes a volatile memory (RAM). The volatile memory 15 stores the program, control data, and correction data, which are transferred from the nonvolatile memory 14 storing these program and data, and are used when the system controller 13 controls the image capture apparatus. Reference numeral 16 denotes a switch S0 used to control a power-ON/OFF state of the image capture apparatus. Reference numeral 17 denotes a switch S1 used to issue a start instruction of various image capture preparation operations required for the image capture apparatus to perform an image capture operation. Reference numeral 18 denotes a switch S2 used to issue an image capture operation start instruction of the image capture apparatus.

Note that the aforementioned arrangement of the image capture apparatus is merely an example of the arrangement required to practice the present invention, and the present invention is not limited to this embodiment. For example, the above example has explained one image capture apparatus which incorporates an image capture unit and recording unit. Alternatively, an image capture apparatus and recording apparatus may be independently arranged, and captured image signals acquired by the image capture apparatus may be recorded by the recording apparatus. Also, other components can undergo various modifications and changes within the scope of the spirit of the invention.

Figure 2A:
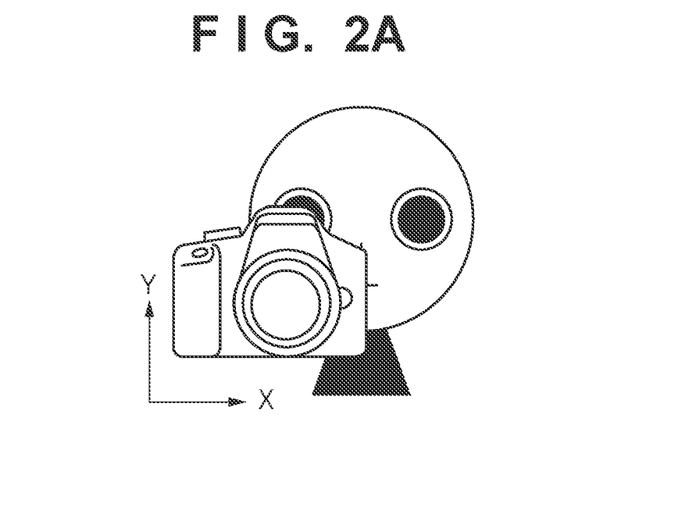
FIGS. 2A to 2D are schematic views for explaining the arrangements of the image capture apparatus and a solid state image sensor, display angles of image signals, and combinations of signals per unit pixel, which are used in generation of image signals, in the embodiment of the present invention.
Figure 2B:
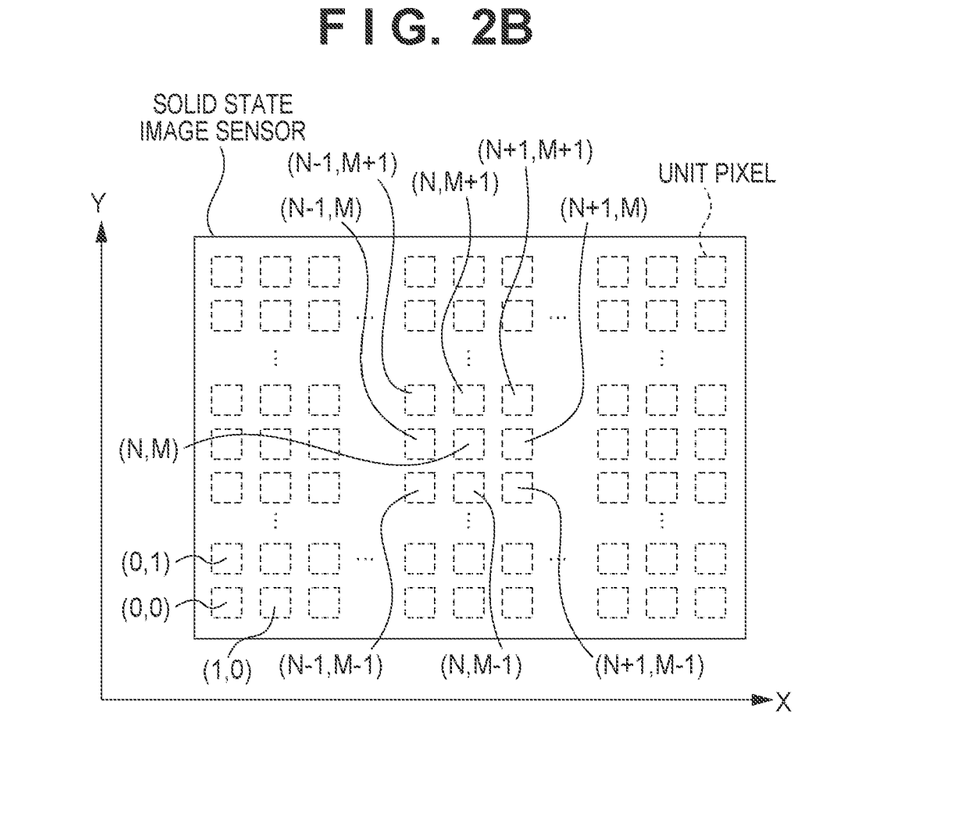

The arrangement of the solid state image sensor incorporated in the image capture apparatus of this embodiment will be described below. FIG. 2B is a schematic view showing an example of the overall arrangement of the solid state image sensor of this embodiment.

In this case, an axis which is parallel to the bottom surface of the image capture apparatus is defined as an x-axis, and an axis which is perpendicular to the bottom surface of the image capture apparatus is defined as a y-axis, when the solid state image sensor incorporated in the image capture apparatus is viewed from the front side of image capture apparatus. For example, under the assumption that the solid state image sensor is incorporated to have the side of its long side to be parallel to the bottom surface of the image capture apparatus, an axis parallel to the long side is defined as the x-axis, and an axis parallel to the short side is defined as the y-axis.

As shown in FIG. 2B, the solid state image sensor of this embodiment includes (has) a plurality of unit pixels, which are arrayed in a matrix on an image capture plane as a two-dimensional plane. Assume that each individual unit pixel indicated by the broken line in FIG. 2B is expressed by an address described within the broken line. For example, an address of a unit pixel of the 0th column and 1st row is expressed by (0, 1), and that of a unit pixel of the N-th column and M-th row is expressed by (N, M).

Each individual unit pixel indicated by the broken line in FIG. 2B converts irradiated light into an electrical signal, and accumulates and outputs the electrical signal. An example of the detailed arrangement of the unit pixel will be described below.

Figure 3:
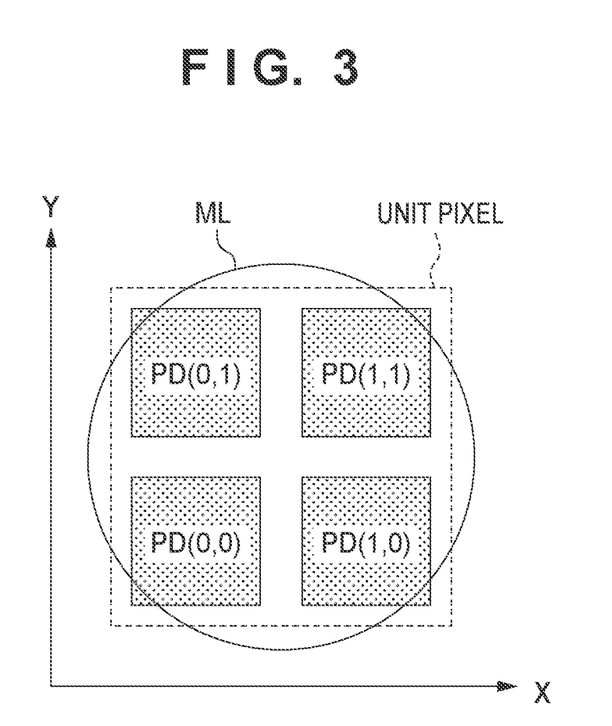
FIG. 3 is a schematic view showing an example of the arrangement of a unit pixel of the solid state image sensor in the embodiment of the present invention.

FIG. 3 is a schematic view showing an example of the arrangement of the unit pixel of the solid state image sensor of this embodiment. FIG. 3 shows a rough layout of photodiodes PD as photo-electric conversion units each for converting light into an electrical signal, and a microlens ML as a condenser unit which condenses light on the photodiodes PD. These photodiodes PD and microlens ML form one unit pixel.

As shown in FIG. 3, on each individual unit pixel, a plurality of photodiodes PD and a microlens ML corresponding to the unit pixel are arranged. In this case, for example, FIG. 3 illustrates a unit pixel on which four photodiodes PD, that is, photodiodes PD(0, 0), PD(1, 0), PD(0, 1), and PD(1, 1) are arranged for one microlens ML.

The example of the arrangement of the solid state image sensor which can practice the present invention has been described. However, the arrangement of the solid state image sensor is merely an example of the arrangement required to practice the present invention. In practice, a solid state image sensor need only have an arrangement including a plurality of photo-electric conversion units per condenser unit. The present invention is not limited to the aforementioned embodiments, and allows various modifications and changes within the scope of the spirit of the invention.

Note that in order to provide parallaxes in a plurality of directions between the plurality of photo-electric conversion units included in one pixel, the number of photodiodes PD is preferably three or more.

A recording unit, which records captured image signals read out from the aforementioned solid state image sensor, will be described below using FIGS. 2B and 2D and FIGS. 4A to 4D.

Figure 2C:
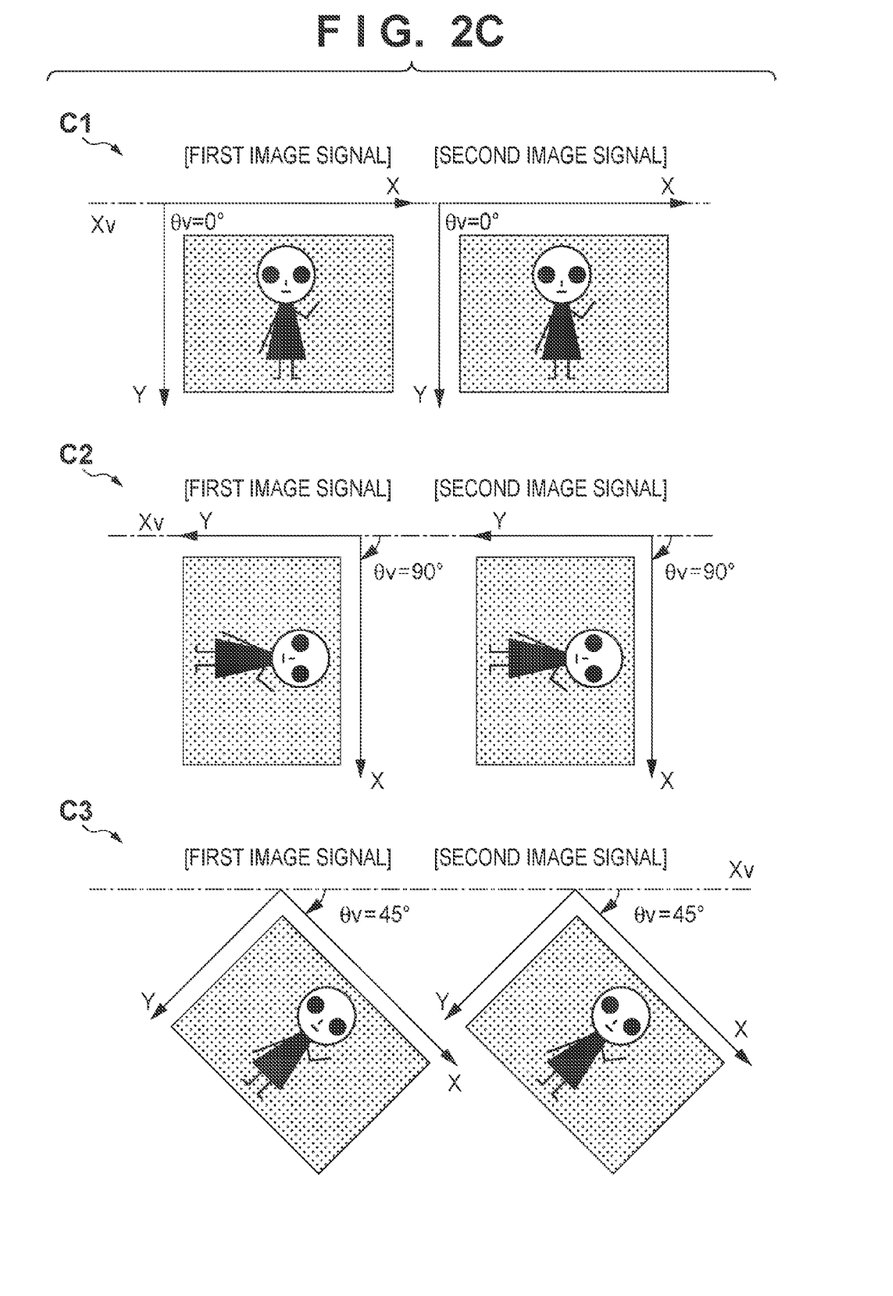
Figure 2D:
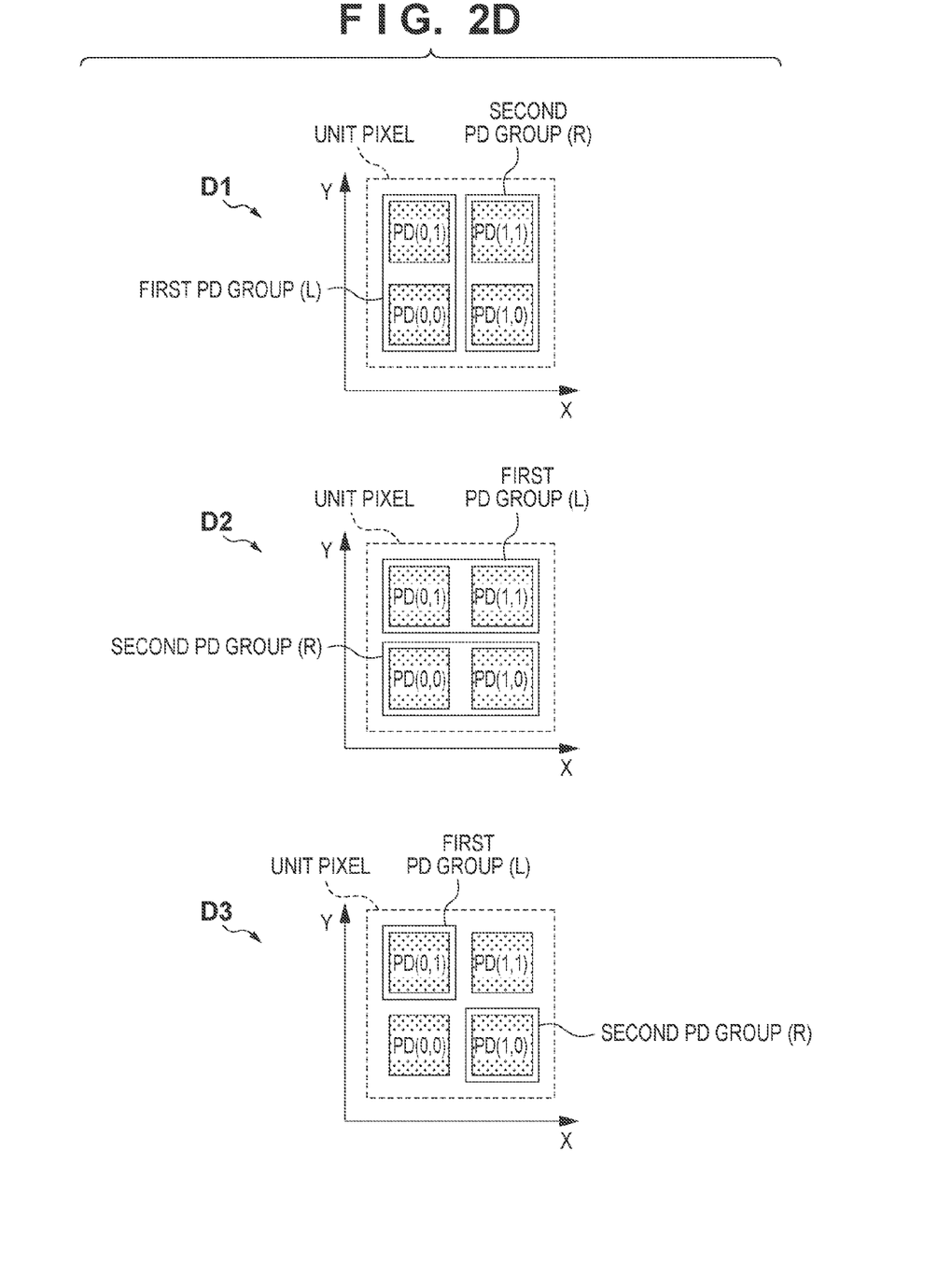

Each of D1, D2, and D3 of FIG. 2D simply illustrates an array of a plurality of photodiodes PD included in one unit pixel of the plurality of unit pixels indicated by the broken lines in FIG. 2B, and is equal to the unit pixel shown in FIG. 3. In FIG. 2D, the microlens ML is not shown for the sake of simplicity.

The plurality of photodiodes PD corresponding to one unit pixel are provided with different tags as identification information, so as to allow to specify each individual photodiode PD. For example, each individual photodiode PD is provided with a tag which includes, as identification information, information (position information) associated with a positional relationship of the respective photodiodes in the unit pixel. In this embodiment, a case will be exemplified wherein each pixel group corresponding to each unit pixel is provided with tag information associated with a position x in the x-axis direction and a position y in the y-axis direction like (x, y). For example, as shown in FIG. 3, the photodiode PD(0, 0) is provided with a tag (0, 0); PD(1, 0), a tag (1, 0); PD(0, 1), a tag (0, 1); and PD(1, 1), a tag (1, 1).

Alternatively, a symbol required for identification may be assigned to each of the plurality of photodiodes PD which form each unit pixel, and may be used as a tag. For example, an identification symbol "LD" may be assigned to the lower left photodiode PD(0, 0), an identification symbol "RU" may be assigned to the upper right photodiode PD(1, 1), and they may be used as tags.

An image capture unit controls the solid state image sensor to accumulate captured image signals, and individually reads out all captured image signals of the respective photodiodes PD (PD(0, 0), PD(1, 0), PD(0, 1), and PD(1, 1)). The readout captured image signals of the photodiodes PD(0, 0), PD(1, 0), PD(0, 1), and PD(1, 1) will be respectively referred to as Sig(0, 0), Sig(1, 0), Sig(0, 1), and Sig(1, 1) hereinafter.

FIGS. 4A to 4D are conceptual views showing sequences of captured image signals and tags, which are recorded by the recording unit according to this embodiment. Data to be recorded by the recording unit will be described below taking, as an example, captured image signals obtained from the plurality of photodiodes PD included in the unit pixel of the N-th column and M-th row, and tags assigned to these photodiodes as identification information.

Figure 4A:
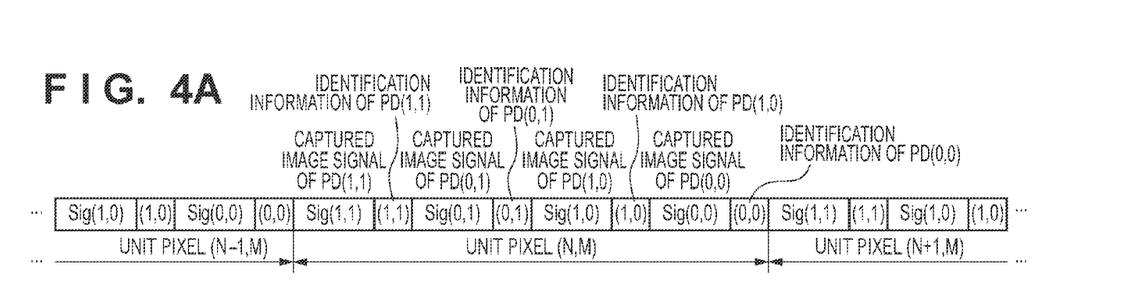
FIGS. 4A to 4D are conceptual views showing sequences of captured image signals and tags, which are recorded by a recording unit in the embodiment of the present invention.

The recording unit assigns the aforementioned tags for respective photodiodes PD to readout captured image signals of the respective photodiodes PD, and saves the levels of the captured image signals and the tags in association with each other. In this embodiment, as shown in FIG. 4A, the recording unit saves the captured image signal Sig(0, 0) of the photodiode PD(0, 0) assigned with the tag (0, 0), the captured image signal Sig(1, 0) of the photodiode PD(1, 0) assigned with the tag (1, 0), the captured image signal Sig(0, 1) of the photodiode PD(0, 1) assigned with the tag (0, 1), and the captured image signal Sig(1, 1) of the photodiode PD(1, 1) assigned with the tag (1, 1). The data which records the captured image signals obtained from the unit pixel of the N-th column and M-th row has been described. Such data are recorded in correspondence with all unit pixels read out from the solid state image sensor.

Figure 4B:
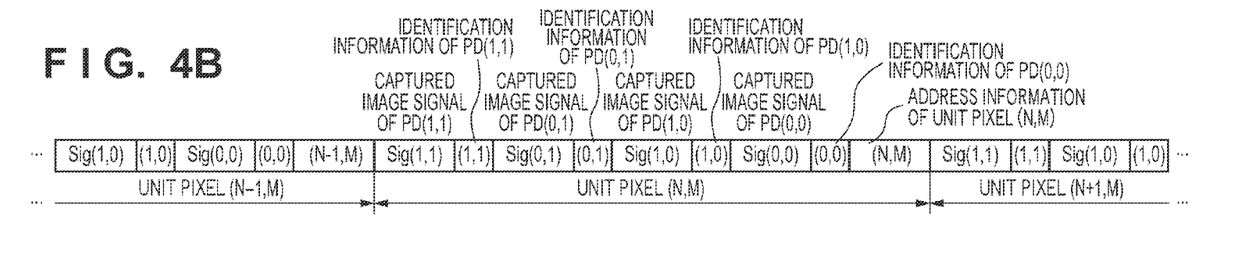

Note that the aforementioned tag for each photodiode PD may be assigned with address information of each unit pixel, which is shown within the broken line indicating each unit pixel in FIG. 2B, in addition to the identification information. Alternatively, as shown in FIG. 4B, address information of each unit pixel may be assigned to data for that unit pixel.

Figure 4C:
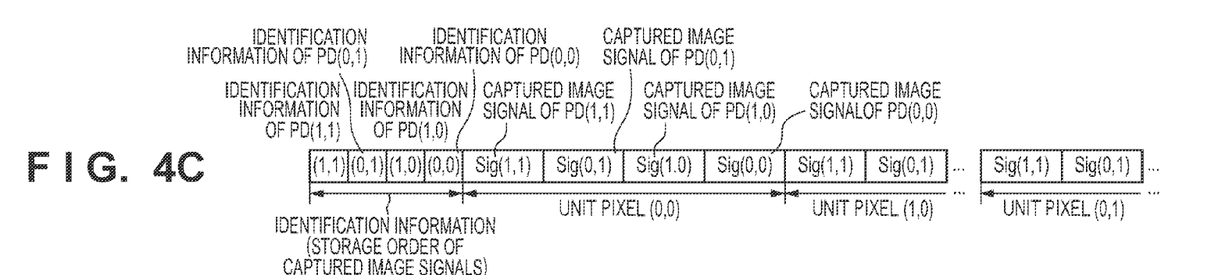
Figure 4D:
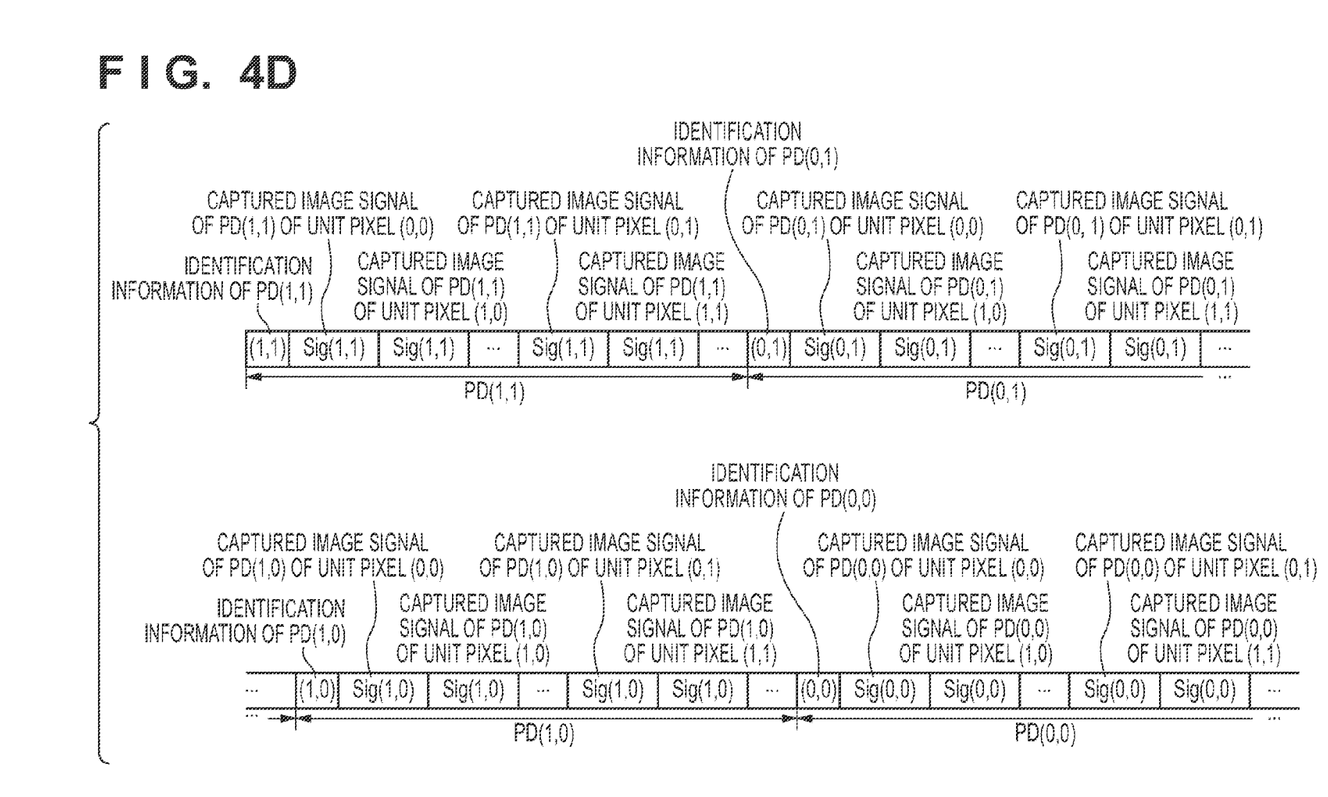

Alternatively, as shown in FIG. 4C, a tag indicating a storage order of signals in data, which records captured image signals of photodiodes PD included in a unit pixel in the same order for all unit pixels, may be recorded at the head of the data which records all captured image signals. Alternatively, as shown in FIG. 4D, all captured image signals obtained from photodiodes PD, which are included in different unit pixels and have common identification information, may be saved together, and the common identification information may be recorded at the head of the sequence as a tag.

By assigning such tag information to a captured image signal obtained from each photodiode PD, a captured image signal and an address of a unit pixel can be easily specified when it is used by an arbitrary image processing unit or display unit. Also, a positional relationship of photodiodes PD in a given PD group and photodiodes PD from which a plurality of captured image signals are obtained from a predetermined unit pixel can be easily specified.

Using captured image signals captured by the image capture apparatus with the aforementioned arrangement, images which can be appreciated as stereoscopic images can be generated independently of rotation angles of the image signals to be displayed.

Use examples of captured image signals used to obtain pairs of images (for stereoscopic vision) suited to stereoscopic vision for various image rotation angles from captured image signals which are saved while being assigned with the tag information will be described below. Note that in the example of the image capture apparatus of this embodiment, the signal processing circuit 7 shown in FIG. 1 is used as an image signal generation unit used to obtain image signals to be displayed from captured image signals. As another example, image signals may be generated by an external image signal generation unit (image signal processing apparatus).

C1, C2, and C3 of FIG. 2C are schematic views showing image rotation angles and images displayed at that time when these images are displayed on the image display device. A first image signal and second image signal shown in each of C1, C2, and C3 of FIG. 2C correspond to a pair of images having a parallax, which are generated from captured image signals captured and recorded by the image capture apparatus shown in FIG. 2A incorporating the solid state image sensor shown in FIG. 2B, and which correspond to right- and left-eye images. An axis, which overlaps the x-axis of the pair of images, when the pair of images are displayed at a rotation angle=0°, is defined as a reference axis xv (indicated by a one-dashed chain line in FIG. 2C) of the display device. Also, let θv be a rotation angle of a displayed image from the reference axis xv of the display device. The rotation angle θv is acquired from a parameter which is designated by an image display program and indicates a rotation angle or that which is input via, for example, an input device based on a user's instruction and indicates a rotation angle.

D1, D2, and D3 of FIG. 2D are schematic views showing combinations of captured image signals, used when respective image signals of a pair of images having a parallax are generated, in correspondence with layouts of photodiodes PD corresponding to the respective signals.

When image signals are to be generated, captured image signals from the plurality of photodiodes PD included in unit pixels are grouped for respective photodiodes PD, which are divided by a line perpendicular to the axis xv, based on the tag information. Then, an image signal which forms one image is generated from the captured image signals of each group, thereby obtaining first and second images having different parallaxes in the x-axis direction.

An example when images generated based on captured image signals captured by the image capture apparatus with the arrangement shown in FIG. 2B are displayed at a landscape position will be described first. When the rotation angle θv=0° of the displayed images, as shown in C1 of FIG. 2C, the photodiodes PD(0, 0) and PD(0, 1) are selected as a first PD group, as indicated by the solid line in D1 of FIG. 2D, and a first image signal is generated using the captured image signals by the first PD group. Also, the photodiodes PD(1, 0) and PD(1, 1) are selected as a second PD group, and a second image signal is generated using captured image signals by the second PD group. Then, a first image is formed by the first image signal obtained in this way, and a second image is formed by the second image signal, thus obtaining the first and second images having different parallaxes in the x-axis direction.

When the first and second images obtained in this way are used as the aforementioned "left-eye image" and "right-eye image", images having a parallax direction suited to stereoscopic vision when the images are displayed at the landscape position can be generated.

Even when images are to be displayed at the landscape position, if θv=180° (at a position opposite to the aforementioned case), the photodiodes PD(1, 0) and PD(1, 1) can be selected as a first PD group to generate a first image signal, and the photodiodes PD(0, 0) and PD(0, 1) can be selected as a second PD group to generate a second image signal.

An example when images generated based on captured image signals captured by the image capture apparatus with the arrangement shown in FIG. 2B are displayed at a portrait position will be described below. When the rotation angle θv=90° of the displayed images, as shown in C2 of FIG. 2C, the photodiodes PD(0, 0) and PD(0, 1) are selected as a second PD group, as indicated by the solid line in D2 of FIG. 2D, and a second image signal is generated using the captured image signals by the second PD group. Also, the photodiodes PD(1, 0) and PD(1, 1) are selected as a first PD group, and a first image signal is generated using captured image signals by the first PD group. Then, a first image is formed by the first image signal obtained in this way, and a second image is formed by the second image signal, thus obtaining the first and second images having different parallaxes in the y-axis direction.

When the first and second images obtained in this way are used as the aforementioned "left-eye image" and "right-eye image", images having a parallax direction suited to stereoscopic vision when the images are displayed at the portrait position can be generated.

Even when images are to be displayed at the portrait position, if θv=270° (at a position opposite to the aforementioned case), the photodiodes PD(0, 0) and PD(1, 0) can be selected as a first PD group to generate a first image signal, and the photodiodes PD(0, 1) and PD(1, 1) can be selected as a second PD group to generate a second image signal.

Finally, an example when images generated based on captured image signals captured by the image capture apparatus with the arrangement shown in FIG. 2B are displayed at an oblique position will be described below. When the rotation angle θv=45° of the displayed images, as shown in C3 of FIG. 2C, the photodiode PD(0, 1) is selected as a first PD group, as indicated by the solid line in D3 of FIG. 2D, and a first image signal is generated using the captured image signal by the first PD group. Also, the photodiode PD(1, 0) is selected as a second PD group, and a second image signal is generated using the captured image signal by the second PD group. Then, a first image is formed by the first image signal obtained in this way, and a second image is formed by the second image signal, thus obtaining the first and second images having different parallaxes in an oblique direction. At this time, since the number of captured image signals that can be used is reduced compared to the portrait and landscape positions, signals by the respective PD groups may be multiplied by a desired gain when they are used. For example, in this case, since the number of captured image signals that can be used is reduced to ½ compared to that at the portrait or landscape position, the signals may be further multiplied by a gain of about 2×, so as to obtain the same signal level as an addition result of the plurality of captured image signals.

When the first and second images obtained in this manner are used as the aforementioned "left-eye image" and "right-eye image", images can be generated that have a parallax direction suited to stereoscopic vision when the images are displayed at the oblique position.

Even when images are to be displayed at the oblique position, if θv=225° (at a position opposite to the aforementioned case), the photodiode PD(0, 1) can be selected as a second PD group to generate a second image signal, and the photodiode PD(1, 0) can be selected as a first PD group to generate a first image signal.

Furthermore, even when images are to be displayed at an oblique position, if θv=315°, the photodiode PD(0, 0) can be selected as a first PD group to generate a first image signal, and the photodiode PD(1, 1) can be selected as a second PD group to generate a second image signal. If θv=135°, the photodiode PD(1, 1) can be selected as a first PD group to generate a first image signal, and the photodiode PD(0, 0) can be selected as a second PD group to generate a second image signal.

Note that the θv cases assuming predetermined angles have been exemplified. Angle ranges for switching groups may be set. For example, captured image signals to be used to generate respective image signals are selected so as to provide parallaxes to the first and second images in a direction closest to a direction parallel to the axis xv, in accordance with the angle θv.

Practical examples will be described below.

0≤θv≤22.5° (around a rotation angle=0°) . . . This angle is handled as θv=0° to generate image signals.
22.5°<θv<67.5° (around a rotation angle=45° at the time of clockwise rotation) . . . This angle is handled as θv=45° to generate image signals.
67.5°≤θv≤112.5° (around a rotation angle=90° at the time of clockwise rotation) . . . This angle is handled as θv=90° to generate image signals.
112.5°<θv<157.5° (around a rotation angle=135° at the time of clockwise rotation) . . . This angle is handled as θv=135° to generate image signals.
157.5°≤θv≤202.5° (around a rotation angle=180°) . . . This angle is handled as θv=180° to generate image signals.
205.5°<θv<247.5° (around a rotation angle=225° at the time of clockwise rotation) . . . This angle is handled as θv=225° to generate image signals.
247.5°≤θv≤292.5° (around a rotation angle=270° at the time of clockwise rotation) . . . This angle is handled as θv=270° to generate image signals.
292.5°<θv<337.5° (around a rotation angle=315° at the time of clockwise rotation) . . . This angle is handled as θv=315° to generate image signals.
337.5°≤θv≤360° (around a rotation angle=0°). This angle is handled as θv=0° to generate image signals.

Figure 5:
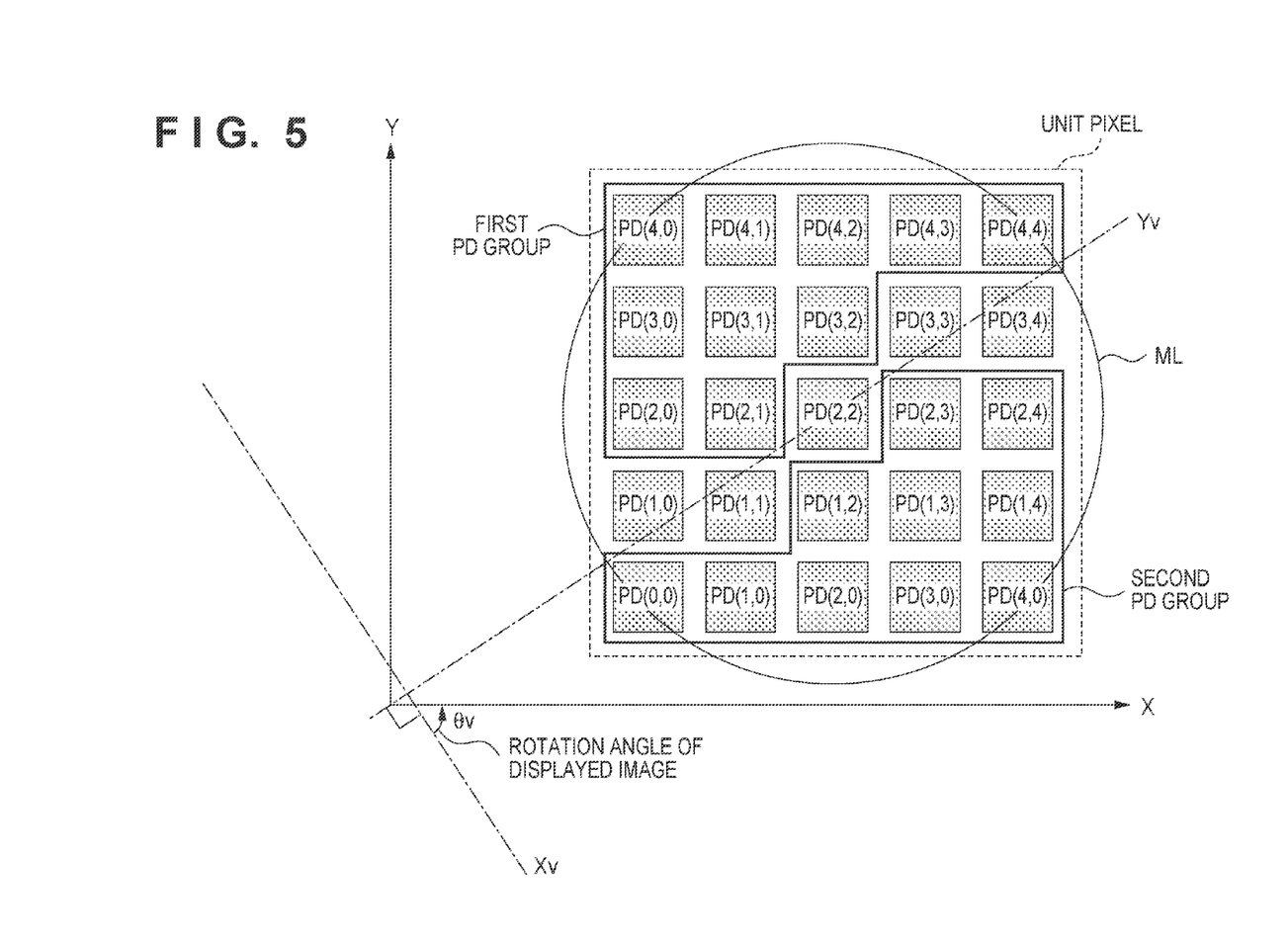
FIG. 5 is a schematic view showing an example of the arrangement of a unit pixel of the solid state image sensor in a modification of the embodiment of the present invention.

The arrangement using the solid state image sensor in which four photodiodes PD are disposed in a 2×2 matrix per unit pixel, as shown in FIG. 3, has been exemplified so far. However, in case of such use method, in a unit pixel of the solid state image sensor, a larger number of photodiodes are desirably disposed as much as possible. This is because, when a larger number of photodiodes are disposed, as shown in FIG. 5, first and second PD groups used to generate first and second image signals can be freely selected from the large number of photodiodes PD. Therefore, a direction of a parallax provided between the "right-eye image" and "left-eye image" can be adjusted more precisely.

A case will be exemplified below wherein images to be displayed are displayed while being rotated through θv° with respect to the reference axis xv of the display device in FIG. 5. An axis, which is perpendicular to the reference axis xv of the display device and passes through the barycenter of light that has passed through the microlens ML, is defined as an axis yv. At this time, photodiodes PD, which are included in one of regions divided by the axis yv, of a plurality of photodiodes PD included in a unit pixel, are selected as a first PD group, and photodiodes PD included in the other region are selected as a second PD group. The respective PD groups are indicated by the solid lines in FIG. 5.

Captured image signals obtained from the photodiodes PD included in the first PD group are selected based on tags assigned to the captured image signals obtained from the respective photodiodes PD to generate a first image signal. Captured image signals obtained from the photodiodes PD included in the second PD group are similarly selected to generate a second image signal.

Thus, the direction of a parallax provided between the first and second images can be decided more precisely, and images more suited to be appreciated as stereoscopic images upon rotating images displayed on the display device can be obtained.

The aforementioned embodiment and modification are respectively suitable examples of aspects upon practicing the present invention. The present invention is not limited to these embodiments, and allows various modifications and changes within the scope of the gist of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-032629, filed Feb. 17, 2011, which is hereby incorporated by reference herein in its entirety.

What is claimed is:

1. An image capture apparatus comprising:
    image capture unit having a plurality of micro-lenses, wherein a plurality of photo-electric conversion portions are arranged for each of the micro-lenses;
    recording unit configured to record captured image signals which are read out from the photo-electric conversion portions;
    outputting unit configured to output positional information which corresponds to positions of the photo-electric conversion portions in each micro-lens; and
    a processing unit configured to group the image signals of the photo-electric conversion portions into groups based on the positional information output by the outputting unit,
    wherein the outputting unit outputs the positional information with regard to respective photo-electric conversion portions to group the image signals into groups to have a parallax direction corresponding to a left-eye image and a right-eye image,
    wherein each of the groups includes the image signals which are read out from two or more photo-electric conversion portions, and
    wherein the processing unit adjusts a gain of the image signals based on a number of captured image signals combined into the respective groups.

2. The image capture apparatus according to claim 1, wherein the outputting unit outputs pieces of different positional information in association with respective captured image signals of the plurality of photo-electric conversion portions corresponding to the micro-lens.

3. The image capture apparatus according to claim 1, wherein the positional information indicates a positional relationship of a respective photo-electric conversion portion corresponding to the micro-lens.

4. An image signal processing apparatus generating image signals for stereoscopic vision using captured image signals in respective photo-electric conversion portions of an image capture apparatus according to claim 1, and pieces of the positional information respectively associated with the captured image signals.

5. The apparatus according to claim 4,
wherein the positional information indicates a positional relationship of a respective photo-electric conversion portion corresponding to the micro-lens.

6. The image capture apparatus according to claim 1, further comprising
a specifying unit to specify addresses of the photo-electric conversion portions based on the positional information,
wherein the processing unit combines the image signals which are read out from the photo-electric conversion portions based on the addresses of the photo-electric conversion portions.

7. The image capture apparatus according to claim 1,
wherein the processing unit combines the image signals which are read out from the photo-electric conversion portions into the groups in accordance with a rotation angle.

8. The image capture apparatus according to claim 1,
wherein the positional information includes a physical positional relationship between the photo-electric conversion portion and micro-lens corresponding to the photo-electric conversion portions.

9. The image capture apparatus according to claim 1,
wherein the outputting unit outputs the positional information for respective photo-electric conversion portions in association with the respective image signals read out from the respective photo-electric conversion portions.

10. The image capture apparatus according to claim 1,
wherein the positional information is associated with a position x in the x-axis direction and a position y in the y-axis direction.

11. The image capture apparatus according to claim 1,
wherein the positional information is output at the head of the image signals recorded by the recording unit.

12. The image capture apparatus according to claim 11,
wherein the recording unit records capture image signals for each of a plurality of image signals having common positional information.

13. An image signal processing method comprising:
generating image signals for stereoscopic vision using captured image signals in respective photo-electric conversion portions of an image capture apparatus according to claim 1, and
associating pieces of the positional information with the captured image signals.

14. The image capture apparatus according to claim 3,
wherein the positional relationship of respective photo-electric conversion portions is related to address information corresponding to the position of the each micro-lens.

15. The image capture apparatus according to claim 1,
wherein the processing unit determines an imaging process for the image signals based on the positional information which is related to the image signals.

16. The image capture apparatus according to claim 1,
wherein the outputting unit outputs the positional information to external apparatus to generate image signal to be displayed.

17. The image capture apparatus according to claim 1,
wherein the processing unit processes the image signals based on the positional information output by the outputting unit after the recording unit records captured image signals which are processed by the processing unit.

18. A method of controlling an image capture apparatus including image capture unit having a plurality of micro-lenses, wherein a plurality of photo-electric conversion portions are arranged for each of the micro-lenses, said method comprising:
recording captured image signals which are read out from the photo-electric conversion portions; and
outputting positional information which corresponds to positions of the photo-electric conversion portions each micro-lens; and
grouping the image signals of the photo-electric conversion portions into groups based on the positional information output by the outputting unit,
wherein in the outputting, the positional information with regard to respective photo-electric conversion portions is output to group the image signals into groups to have a parallax direction corresponding to a left-eye image and a right-eye image,
wherein each of the groups includes the image signals which are read out from two or more photo-electric conversion portions, and
wherein in the grouping, a gain of the image signals is adjusted based a number of captured image signals combined into the respective groups.

\* \* \* \* \*